(12) United States Patent
Chung et al.

(10) Patent No.: US 11,255,868 B2
(45) Date of Patent: Feb. 22, 2022

(54) FLUID CONTROL EQUIPMENT FOR BIO-REACTION, BIO-REACTION SYSTEM AND FLUID CONTROL METHOD FOR BIO-REACTION

(71) Applicant: ELECTRONICS AND TELECOMMUNICATIONS RESEARCH INSTITUTE, Daejeon (KR)

(72) Inventors: Kwang Hyo Chung, Daejeon (KR); Bong Kyu Kim, Daejeon (KR); Jin Tae Kim, Daejeon (KR); Chang-Geun Ahn, Sejong (KR); Eun-Ju Jeong, Daejeon (KR); Chul Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 373 days.

(21) Appl. No.: 16/211,160

(22) Filed: Dec. 5, 2018

(65) Prior Publication Data

US 2019/0250183 A1    Aug. 15, 2019

(30) Foreign Application Priority Data

Feb. 12, 2018  (KR) .................. 10-2018-0017255
Oct. 5, 2018   (KR) .................. 10-2018-0119356

(51) Int. Cl.
*G01N 35/10* (2006.01)

(52) U.S. Cl.
CPC ..... *G01N 35/1016* (2013.01); *G01N 35/1002* (2013.01); *G01N 35/1004* (2013.01); *G01N 35/1011* (2013.01); *G01N 35/1074* (2013.01); *G01N 2035/1006* (2013.01)

(58) Field of Classification Search
None
See application file for complete search history.

(56) References Cited

U.S. PATENT DOCUMENTS

| 8,088,593 | B2 | 1/2012 | Burd et al. |
| 8,440,148 | B2 | 5/2013 | Shin et al. |
| 2007/0077580 | A1 | 4/2007 | Ikeda et al. |
| 2007/0148780 | A1* | 6/2007 | Murata .............. B01L 7/00 436/147 |
| 2009/0155123 | A1* | 6/2009 | Williams ........ F16K 99/0001 422/65 |
| 2009/0180930 | A1* | 7/2009 | Aoki ................ B01L 3/0241 422/63 |
| 2010/0143194 | A1 | 6/2010 | Lee et al. |
| 2013/0011880 | A1* | 1/2013 | Barbee .............. G01N 35/10 435/91.2 |

(Continued)

FOREIGN PATENT DOCUMENTS

| JP | 2007097470 A | 4/2007 |
| JP | 2013148598 A | 8/2013 |

(Continued)

*Primary Examiner* — Matthew D Krcha
*Assistant Examiner* — Brittany I Fisher

(57) ABSTRACT

Provided is fluid control equipment for bio-reaction, including a pipette configured to transport a reaction solution, and a liquid pump configured to adjust the internal pressure of the pipette.

9 Claims, 10 Drawing Sheets

(56) References Cited

U.S. PATENT DOCUMENTS

2013/0183769 A1* 7/2013 Tajima .................. G01N 21/01
                                                                  436/165
2016/0291009 A1   10/2016 Kim et al.
2016/0341725 A1* 11/2016 Hamada ................ B01L 3/0275

FOREIGN PATENT DOCUMENTS

| KR | 100961468 B1 | 6/2010 |
| KR | 101199303 B1 | 11/2012 |
| KR | 1020180032684 A | 3/2018 |
| WO | 2015183871 A1 | 12/2015 |

* cited by examiner

FLUID CONTROL EQUIPMENT FOR BIO-REACTION, BIO-REACTION SYSTEM AND FLUID CONTROL METHOD FOR BIO-REACTION

CROSS-REFERENCE TO RELATED APPLICATIONS

This U.S. non-provisional patent application claims priority under 35 U.S.C. § 119 of Korean Patent Application Nos. 10-2018-0017255, filed on Feb. 12, 2018, and 10-2018-0119356, filed on Oct. 5, 2018, the entire contents of which are hereby incorporated by reference.

BACKGROUND

The present disclosure herein relates to fluid control equipment for bio-reaction, a bio-reaction system and a fluid control method for bio-reaction, and more particularly, to fluid control equipment for bio-reaction, a bio-reaction system and a fluid control method for a bio-reaction in which spray equipment for a washing solution is simplified.

An immune response is an antigen-antibody binding reaction in which an antigen and an antibody selectively bind to each other, and thus the immune response is frequently used for a biosensor to measure the presence and amount of a specific antigen or antibody in a sample. As a typical method of an immune response, there is an enzyme-linked immunosorbent assay, which is a method for measuring an amount of an antigen-antibody reaction by using an enzyme as an indicator. At this time, the indicator may be replaced by a fluorescent material, a nanomaterial, a luminescent material, etc. instead of the enzyme.

Typically, all of the immune response methods have been performed by skilled experimenters, but recently, studies have been conducted on automated immune response equipment, with which the immune response is automated.

SUMMARY

The present disclosure provides fluid control equipment for bio-reaction, which is capable of performing spray of a washing solution and transport of a reaction solution by using the same pipette.

The present disclosure also provides fluid control equipment for bio-reaction, capable of reducing the volume thereof.

The present disclosure also provides fluid control equipment for bio-reaction, capable of controlling a plurality of pipettes at the same flow rate.

The present disclosure also provides fluid control equipment for bio-reaction, capable of obtaining an accurate result even when a plurality of pipettes is used.

The present disclosure also provides fluid control equipment for bio-reaction, capable of ensuring convenience in performing a bio-reaction and also capable of improving reproducibility.

The objects of the inventive concept are not limited to the above-described objects and further objects, not described above, will be clearly understood to those skilled in the art from the following description.

An embodiment of the inventive concept provides fluid control equipment for bio-reaction including a pipette configured to transport a reaction solution; and a liquid pump configured to adjust the internal pressure of the pipette.

In an embodiment, a working fluid positioned in the pipette may include a liquid.

In an embodiment, the working fluid in the pipette may include a washing solution.

In an embodiment, the pipettes may be provided in plurality.

In an embodiment, the fluid control equipment may further include a pressure equalization tank positioned between the liquid pump and the pipettes, and each of the pipettes may be disposed in parallel to the pressure equalization tank.

In an embodiment, the fluid control equipment may further include microchannels respectively positioned between the pipettes and the pressure equalization tank, and each of the pipettes may be connected to the pressure equalization tank through the microchannels.

In an embodiment, the fluid control equipment may further include a controller, and the controller may control the liquid pump to adjust the pressure of a working fluid in the pipette.

In an embodiment, the fluid control equipment may further include a movement device; the controller may control the movement device; and the movement device may move the position of the pipette.

In an embodiment, the fluid control equipment may further include a storage tank, and the storage tank may be connected to the liquid pump and supply a working fluid of the pipette to the liquid pump.

In an embodiment, the pipettes and the microchannels may be detachably coupled to each other, respectively.

An embodiment of the inventive concept provides a bio-reaction system including a pipette configured to transport a reaction solution; a liquid pump configured to adjust the internal pressure of the pipette; and a reaction chip on which a bio-reaction occurs.

In an embodiment, the reaction chip may include a reaction solution well and a reaction well, and the reaction solution well may store a reaction solution, and the reaction well may store a material which reacts with the reaction solution.

In an embodiment, the reaction solution well may be provided in plurality and the reaction well may be provided in plurality.

In an embodiment, the pipettes may be provided in plurality.

In an embodiment, the bio-reaction system may further include a waste container configured to discard a reaction solution or a washing solution.

In an embodiment, the reaction well may include a cover.

In an embodiment, the reaction chip may further include a facilitating device configured to promote a bio-reaction, and the facilitating device may include a vibrating device or a heating device.

In an embodiment, the bio-reaction system may further include a measurement device configured to observe the reaction well.

In an embodiment of the inventive concept, a fluid control method for bio-reaction includes moving upwards a washing solution positioned in a pipette by operating a liquid pump; moving upwards a gas positioned under the washing solution by moving the washing solution upwards; and absorbing a reaction solution into the pipette by moving the gas upwards.

More specific details of embodiments of the inventive concept are not limited to the above-described embodiments and further details, not described above, will be clearly understood to those skilled in the art from the following description.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
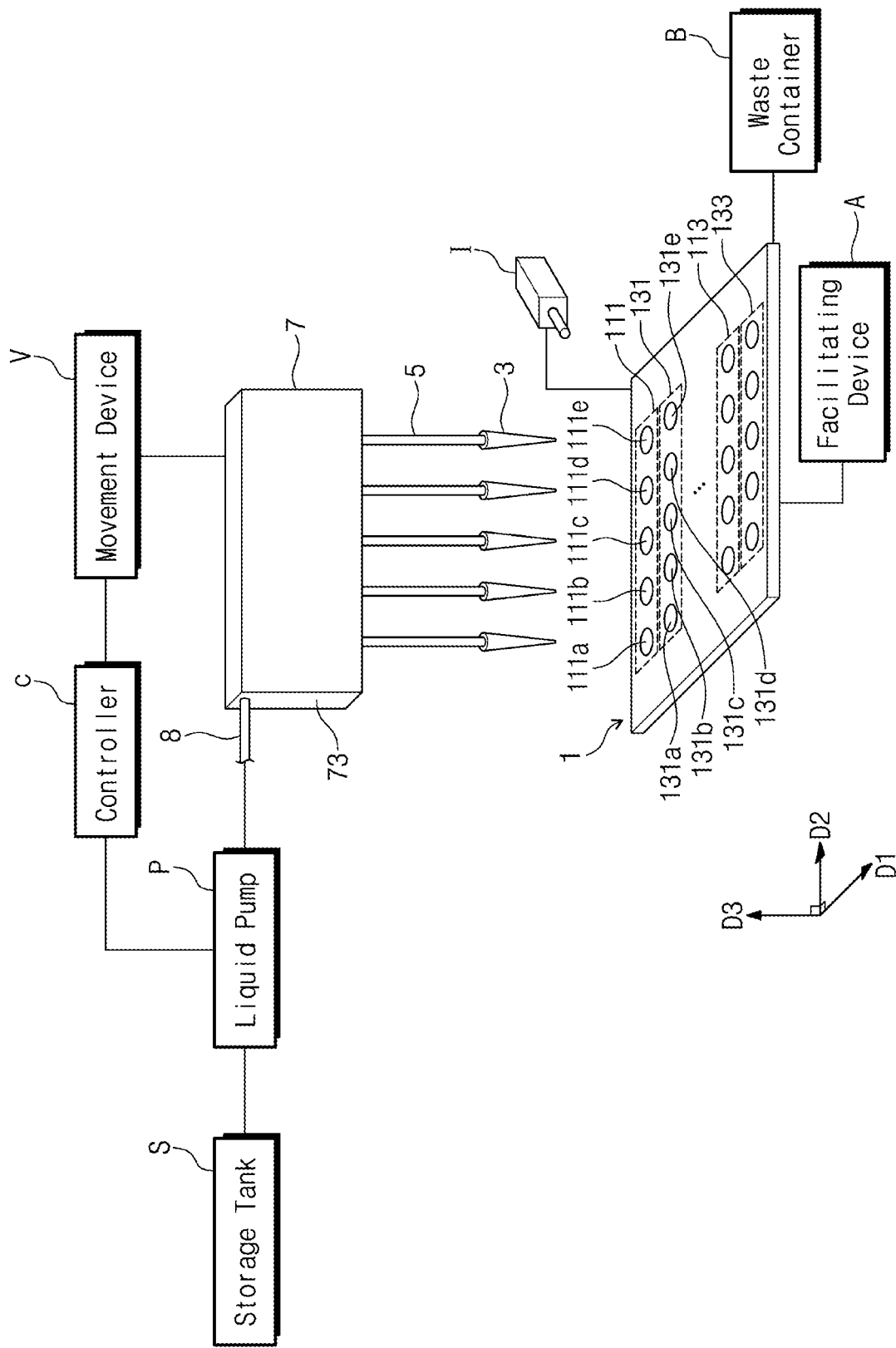
FIG. 1 is a conceptual diagram illustrating a bio-reaction system according to exemplary embodiments of the inventive concept.

To fully understand the constitution and effect of the technical idea of the inventive concept, preferred embodiments of the technical idea of the inventive concept will be described with reference to the accompanying drawings. However, the technical idea is not limited to the embodiments described hereinafter but may be embodied in various forms and may make various changes. Rather, these embodiments are provided so that this disclosure of the technical idea of the inventive concept will be thorough and complete, and will fully convey the scope of the inventive concept to those skilled in the art.

Like reference numbers refer to like elements throughout the whole specification. The embodiments described herein will be described with reference to block diagrams, perspective views and/or cross-sectional views that are ideal illustrations of the present invention. In the drawings, the thicknesses of the regions are exaggerated for an effective explanation of the technical content. Thus, the regions illustrated in the figures have rough attributes, and the shapes of the regions illustrated in the figures are intended to illustrate specific types of regions of the elements and are not intended to limit the scope of the invention. Although the various terms in various embodiments of the present disclosure are used to describe various components, these components should not be limited by these terms. These terms have only been used to distinguish one element from another. The embodiments described and exemplified herein also include their complementary embodiments.

The terminology used herein is for the purpose of illustrating embodiments and is not intended to be limiting of the present invention. In this specification, singular forms include plural forms unless the context clearly dictates otherwise. The terms 'comprise' and/or 'comprising' used in the specification do not exclude the presence or addition of one or more other elements.

Hereinafter, exemplary embodiments of the inventive concept will be described in detail with reference to the accompanying drawings.

FIG. 1 is a conceptual diagram illustrating a bio-reaction system according to exemplary embodiments of the inventive concept.

Hereinafter, in FIG. 1, a direction D1, a direction D2, and a direction D3 may be referred to as a first direction, a second direction, and a third direction, respectively. Also, the first direction, the second direction, and the third direction may be referred to as a front side, a right side, and an upper side, respectively.

Referring to FIG. 1, the bio-reaction system may include fluid control equipment for bio-reaction, and a reaction chip 1. The fluid control equipment for bio-reaction may include a pipette 3, a microchannel 5, a pressure equalization tank 7, an injection tube 8, a liquid pump P, a storage tank S, a movement device V, and a controller C.

The pipette 3 may transport a fluid such as a reaction solution, a washing solution, and/or air. The pipette 3 may have an internal space 3h (see FIG. 4). A fluid such as a reaction solution, a washing solution, and/or air may be positioned in the internal space 3h. In the embodiments, the inner surface 33, of the pipette, defining the internal space 3h may become larger in diameter toward the third direction D3. As the inner surface 33 of the pipette, the outer surface 31 of the pipette may become larger in cross-sectional area toward the third direction D3. That is, the pipette 3 may have a truncated-cone form. However, the embodiments are not limited thereto, and the outer surface 31 of the pipette may have a constant diameter. The internal space 3h may communicate with the outside in a direction opposite to the third direction D3. A fluid such as a reaction solution, a washing solution, and/or air positioned in the internal space 3h may flow in or out to the outside through the portion communicated with the outside. The internal space 3h may communicate with an internal space 5h of the microchannel 5 in the third direction D3. In the embodiments, a fluid such as a reaction solution, a washing solution, and/or air positioned in the internal space 3h of the pipette 3 may flow in or out to the microchannel 5 through the portion communicated with the internal space 5h of the microchannel 5. In the embodiments, only the washing solution may flow in or out from the internal space 3h of the pipette 3 to the microchannel 5 through the portion communicated with the internal space 5h of the microchannel 5. A fluid such as a reaction solution and/or air may not flow in or out to the microchannel 5. A plurality of pipettes 3 may be provided. Referring to FIG. 1, the embodiment in which five pipettes 3 are provided is illustrated. However, the embodiments are not limited thereto, and the number of the pipettes 3 may be one or a different number.

The microchannel 5 may be in a columnar form extending in the third direction D3. In the embodiments, the microchannel 5 may be in a cylindrical form. However, the embodiments are not limited thereto. The microchannel 5 may have an internal space 5h. The internal space 5h of the microchannel 5 may extend in the third direction D3. The microchannel 5 may be coupled to one side of the pipette 3. In the embodiments, the microchannel 5 may be detachably coupled to the pipette 3. To this end, a device configured to attach and detach the pipette 3 may be additionally provided. Alternatively, the pipette 3 may have an own structure which is attachable to or detachable from the microchannel 5. The pipette 3 may be detached from the microchannel 5 and replaced. After the pipette 3 has been used once, easy replacement may be possible. Therefore, cross-contamination of a sample due to reuse of the pipette 3 may be prevented, and the accuracy of the subsequent experiment may be improved. The microchannel 5 may connect the pressure equalization tank 7 and the pipette 3. The internal space 5h of the microchannel 5 may communicate with the internal space 3h of the pipette 3. A fluid in the pipette 3 may flow from the pressure equalization tank 7 through the internal space 5h of the microchannel 5. The diameter of the microchannel 5 may be smaller than the size of the pressure equalization tank 7. A plurality of microchannels 5 may be provided. Referring to FIG. 1, the embodiment in which five microchannels are provided is illustrated. However, the embodiments are not limited thereto, and the number of the microchannel 5 may be one or a different number. The detailed configuration of the microchannel 5 will be described later.

The pressure equalization tank 7 may be coupled to the microchannel 5. The cross-sectional area of the pressure equalization tank 7 may be larger than the cross-sectional area of the microchannel 5. As the cross-sectional area of the microchannel 5 is smaller than the cross-sectional area of the pressure equalization tank 7, the pressure drop occurring in the microchannel 5 may be larger than the pressure drop occurring in the pressure equalization tank 7. Even if the injection tube 8 leans to one side of the pressure equalization tank 7, all the pipettes 3 respectively coupled to ends of the microchannels 5 may have the same or similar internal pressure. The pressure equalization tank 7 may uniformly adjust the pressure of fluid positioned in each of the plurality of the pipettes 3. As the pressure of fluid is controlled uniformly, the flow rate of the fluid may be also controlled uniformly. When the flow rate of the fluid is uniform, the accurate result of a bio-reaction may be obtained even by using a plurality of the pipettes. The pressure equalization tank 7 may be in a rectangular parallelepiped form as illustrated in FIG. 1. However, the embodiments are not limited thereto. Embodiments in which the pressure equalization tank 7 has another form will be described later.

The injection tube 8 may be coupled to one side of the pressure equalization tank 7. In the embodiments, the injection tube 8 may be coupled to the side surface 73 of the pressure equalization tank 7. However, the embodiments are not limited thereto, and the injection tube 8 may be coupled to another side of the pressure equalization tank 7. The injection tube 8 may have a tubular form through which the fluid may flow. The fluid of which the pressure is adjusted by the liquid pump P may flow into the pressure equalization tank 7 through the injection tube 8.

The liquid pump P may be coupled to the injection tube 8. The liquid pump P may adjust the pressure of fluid in the injection tube 8, the pressure equalization tank 7, the microchannel 5 and/or the pipette 3. A term of the 'liquid pump' used herein may refer to a machine configured to adjust the liquid pressure.

The storage tank S may be connected to the liquid pump P. The storage tank S may store the fluid to be supplied to the liquid pump P. The storage tank S may supply the fluid to the liquid pump P. In the embodiments, the fluid stored in the storage tank S may be a liquid. In the embodiments, the fluid stored in the storage tank S may be a washing solution. However, the embodiments are not limited thereto.

The movement device V may allow the pressure equalization tank 7 to move. The detailed configuration for the operating principle of the movement device V will be described later.

The controller C may control the liquid pump P and/or the movement device V. The controller C may adjust the pressure of fluid positioned in the injection tube 8, the pressure equalization tank 7, the microchannel 5, and/or the pipette 3 connected to the liquid pump P by controlling the output of the liquid pump P. As the pressure of fluid is adjusted, the height of the fluid positioned in the internal space 3h (refer to FIG. 4) of the pipette 3 may change. The detailed principle therefor will be described later. The controller C may adjust the position of the pressure equalization tank 7 by controlling the movement device V. When the pressure equalization tank 7 moves through controlling of the controller C, the microchannel 5 and/or the pipette 3 coupled to the pressure equalization tank 7 may also move. The detailed principle therefor will be described later.

The reaction chip 1 may provide a place in which various bio-reactions occur. In the embodiments, the bio-reaction may include an immune response. The immune response may refer to an antigen-antibody binding reaction in which an antigen and an antibody selectively bind to each other. The immune response may include an enzyme-linked immunosorbent assay (hereinafter, referred to as ELISA). The ELISA may be a method for measuring an amount of the antigen-antibody reaction by using an enzyme as an indicator. A material which acts as an indicator in the ELISA may include, in addition to the enzyme, a fluorescent material, a nanomaterial, a luminescent material, etc. In the ELISA, antigen-antibody immobilization, an antigen-antibody reaction, and an indicator response may be performed sequentially. In the intervals of each reaction, a washing process may be required to minimize nonspecific reactions.

The reaction chip 1 may include reaction solution wells 111a to 111e, etc., and reaction wells 131a to 131e, etc.

The reaction solution wells 111a, etc. may store the reaction solution necessary for a bio-reaction. The reaction solution wells 111a, etc. may be in a bowl form having a storage space therein. The cross section of each of the reaction solution wells 111a, etc. may have a circular form. However, the embodiments are not limited thereto. The reaction solution wells 111a, etc. each may include a cover. The cover may prevent a reaction solution stored in the reaction solution wells 111a, etc. from evaporating. A plurality of reaction solution wells 111a, etc. may be provided. The plurality of reaction solution wells 111a to 111e, etc. arranged in the second direction D2 may be referred to as one reaction solution well array 111. A plurality of reaction solution well arrays 111 and 113 may be provided. Each of the plurality of reaction solution well arrays 111 and 113 may be disposed apart from each other in the first direction D1.

The reaction wells 131a, etc. may store a material which reacts with the reaction solution. In the reaction wells 131a, etc., a bio-reaction may occur by the reaction solution stored in each of the reaction solution wells 111a to 111e, etc. The bio-reaction may refer to antigen-antibody immobilization, an antigen-antibody reaction, or an indicator response, etc. The reaction wells 131a, etc. may be in a bowl form having a storage space therein. The reaction wells 131a, etc. may have a circular cross section. However, the embodiments are not limited thereto. The reaction wells 131a, etc. each may include a cover. The cover may prevent the reaction solution stored in the reaction wells 131a, etc. from evaporating. A plurality of reaction wells 131a, etc. may be provided. The plurality of reaction wells 131a to 131e, etc. arranged in the second direction D2 may be referred to as one reaction well array 131. A plurality of reaction well arrays 131 and 133 may be provided. Each of the plurality of reaction well arrays 131 and 133 may be disposed apart from each other in the first direction D1. Each of the reaction solution well arrays 111 and 113, and each of the reaction well arrays 131 and 133 may be alternately disposed in the first direction D1.

In the embodiments, the bio-reaction system according to embodiments of the inventive concept may further include a waste container B. The waste container B may accommodate the fluid stored in the reaction solution wells 111a to 111e, etc. and/or the reaction wells 131a to 131e, etc.

In the embodiments, the reaction chip 1 may be disposable. The reaction chip 1 may be produced by an injection molding method. The reaction chip 1 may include a plastic such as polystyrene, PMMA, COC, and polycarbonate. A surface treatment process may be applied to the reaction chip 1. The reaction chip 1 may reduce antibody immobilization and a nonspecific immune response.

As the reaction chip 1 includes a plurality of the reaction solution wells and/or the reaction wells, multiple reactions may proceed simultaneously. The time necessary for the bio-reaction may be shortened.

In the embodiments, the fluid control equipment for bio-reaction may further include a facilitating device A configured to promote a reaction. The facilitating device A may include a vibrating device or a heating device. The facilitating device A may be positioned on the bottom of the reaction well. The vibrating device may promote the bio-reaction of the reaction solution and the reactant by vibrating the reaction wells. The heating device may promote the bio-reaction of the reaction solution and the reactant by heating the reaction well. The time necessary for the bio-reaction may be shortened.

In the embodiments, the reaction chip 1 may further include a measurement device I configured to obtain the results of the bio-reaction occurring in the reaction wells 131a to 131e, etc. The measurement device I may be positioned above or below the reaction wells 131a to 131e, etc. The measurement device I may include a measurement device for absorbance, a measurement device for fluorescence, a measurement device for luminescence, and/or a measurement device for an electric signal.

Figure 2:
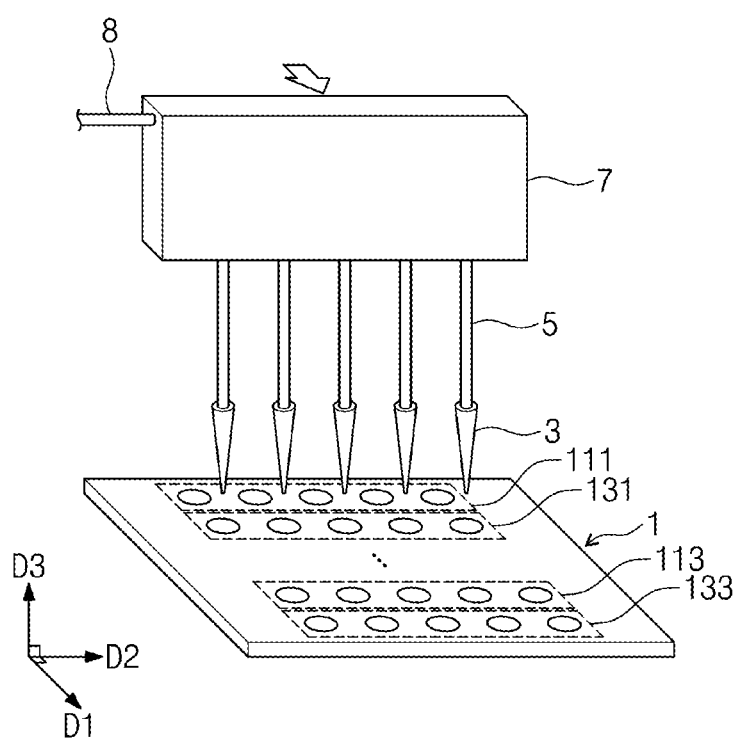
FIGS. 2 and 3 are perspective views illustrating a moving process of a pressure equalization tank 7 in a bio-reaction system according to exemplary embodiments of the inventive concept.
Figure 3:
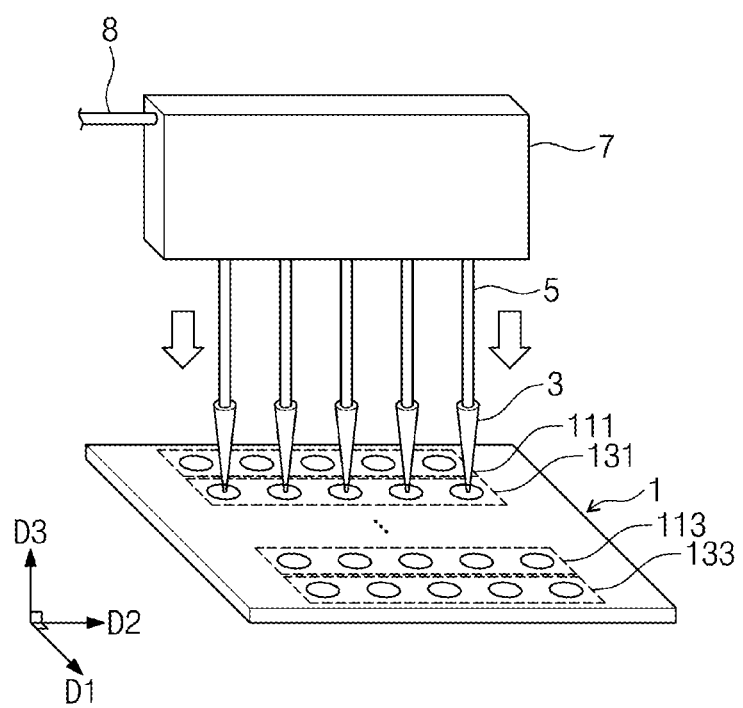

FIGS. 2 and 3 are perspective views illustrating a moving process of the pressure equalization tank 7 in the bio-reaction system according to the embodiments of the inventive concept.

Referring to FIG. 2, the pressure equalization tank 7 may be moved in the first direction D1 by the movement device. As the pressure equalization tank 7 moves, the pipettes 3 may be arranged on the reaction well array 131. At this time, the reaction solution absorbed from the reaction solution well array 111 may be positioned in the internal space of the pipettes 3.

Referring to FIG. 3, the pressure equalization tank 7 may move in a direction opposite to the third direction D3 by the movement device. The pipettes 3 arranged on the reaction well array 131 may move toward the reaction well array 131. The pipettes 3 may be respectively disposed close to the corresponding reaction wells. The controller may adjust the pressure by controlling the liquid pump in order that the pipettes 3 respectively inject the reaction solution into the reaction wells. The detailed process will be described later with reference to FIGS. 4 to 8.

FIGS. 4 to 8 are cross-sectional views illustrating the operating principle of the pipette according to the embodiments of the inventive concept.

Figure 4:
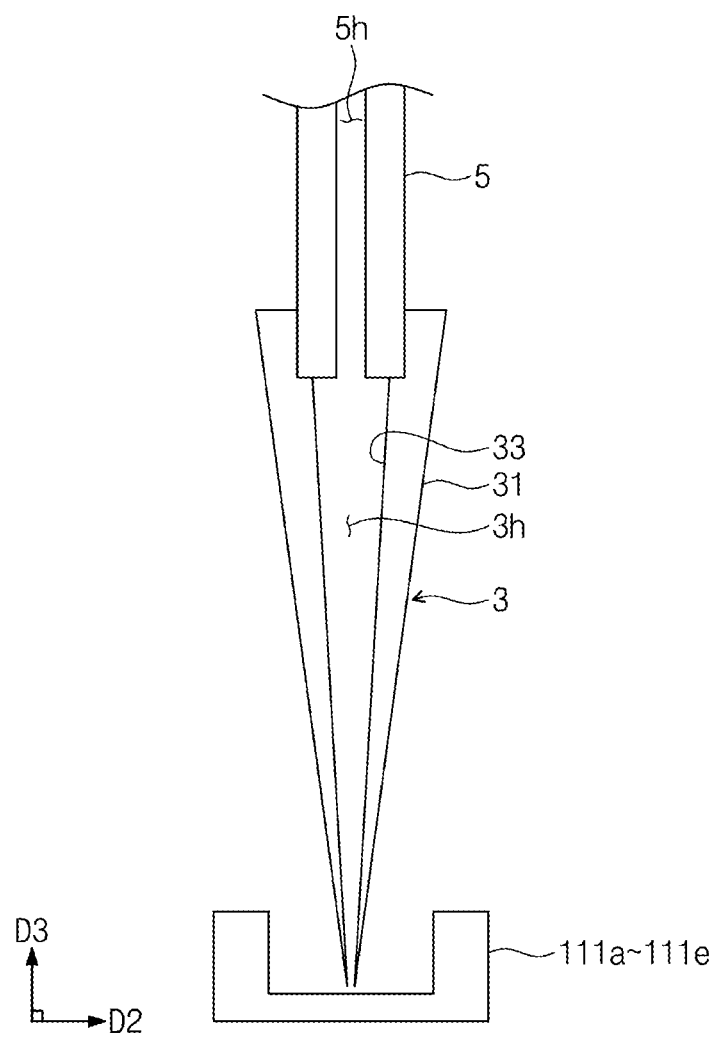
FIGS. 4 through 8 are cross-sectional views illustrating the operating principle of a pipette according to exemplary embodiments of the inventive concept.

Referring to FIG. 4, the pipette 3 may be positioned above the reaction solution wells 111a to 111e, etc. The internal space 3h may be defined inside the pipette 3. The internal space 3h of the pipette 3 may communicate with the internal space 5h of the microchannel 5.

Figure 5:
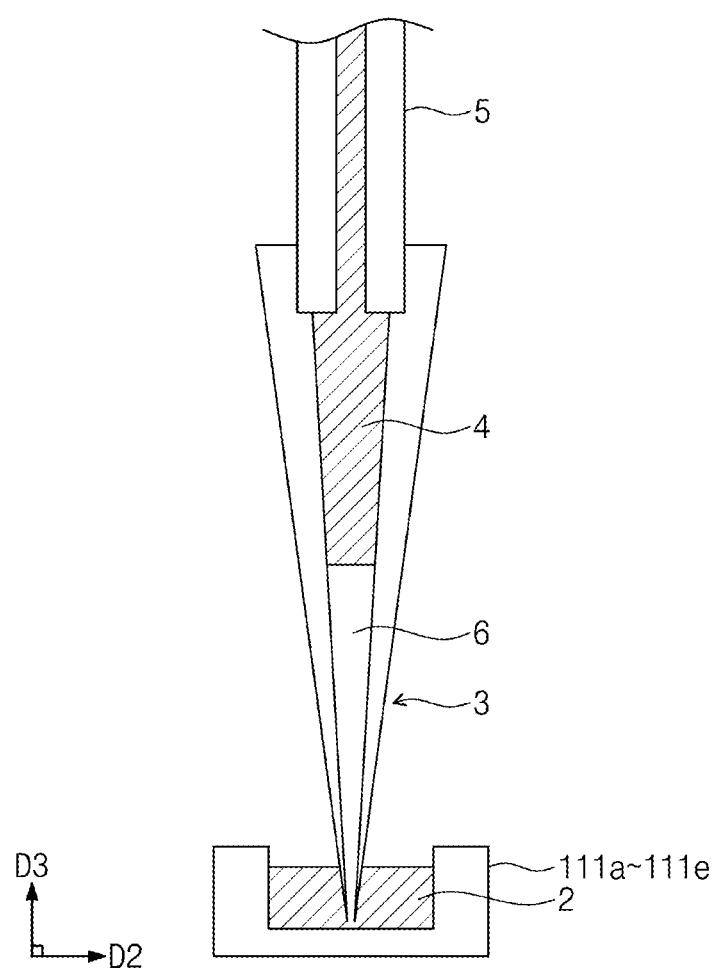

Referring to FIG. 5, a liquid may be positioned in the internal space of the pipette 3. In the embodiments, the liquid may be a washing solution 4. The washing solution 4 may occupy a portion of the internal space of the pipette 3, and may be filled into the internal space of the microchannel 5. In the embodiments, the washing solution 4 may be fully filled into the microchannel 5, the pressure equalization tank 7, the injection tube 8, and the liquid pump P. As the liquid is used as a working fluid, a compressibility effect according to a pressure change may be eliminated, and an accurate fluid control may be possible. In the internal space of the pipette 3, a gas 6 may be positioned under the washing solution 4. In the embodiments, the gas 6 may be air. The reaction solution 2 may be positioned in the reaction solution wells 111a to 111e, etc. The pipette 3 may be positioned such that one end of the pipette 3 is sunk under the reaction solution 2.

Figure 6:
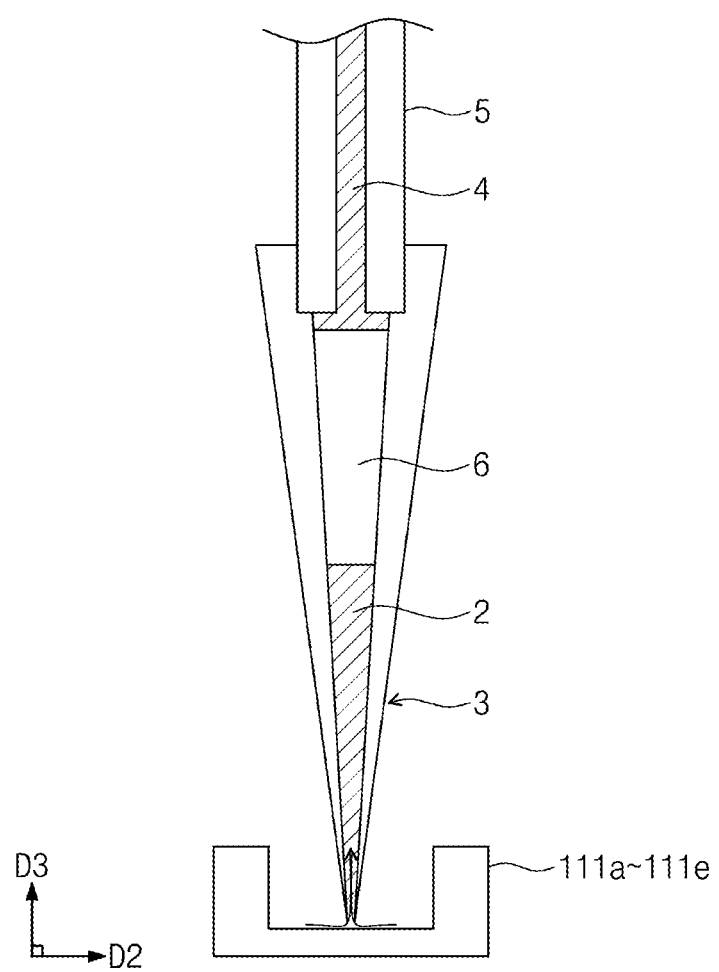

Referring to FIG. 6, as the controller controls the output of the liquid pump, the pressure of the washing solution 4 may be changed. As the pressure of the washing solution 4 changes, the washing solution 4 may move in the third direction D3. The lower level of the washing solution 4 may rise. The gas 6 may move in the third direction D3. As the gas 6 moves in the third direction D3, the reaction solution 2 positioned in the reaction solution wells 111a to 111e, etc. may be suctioned into the internal space of the pipette 3.

Figure 7:
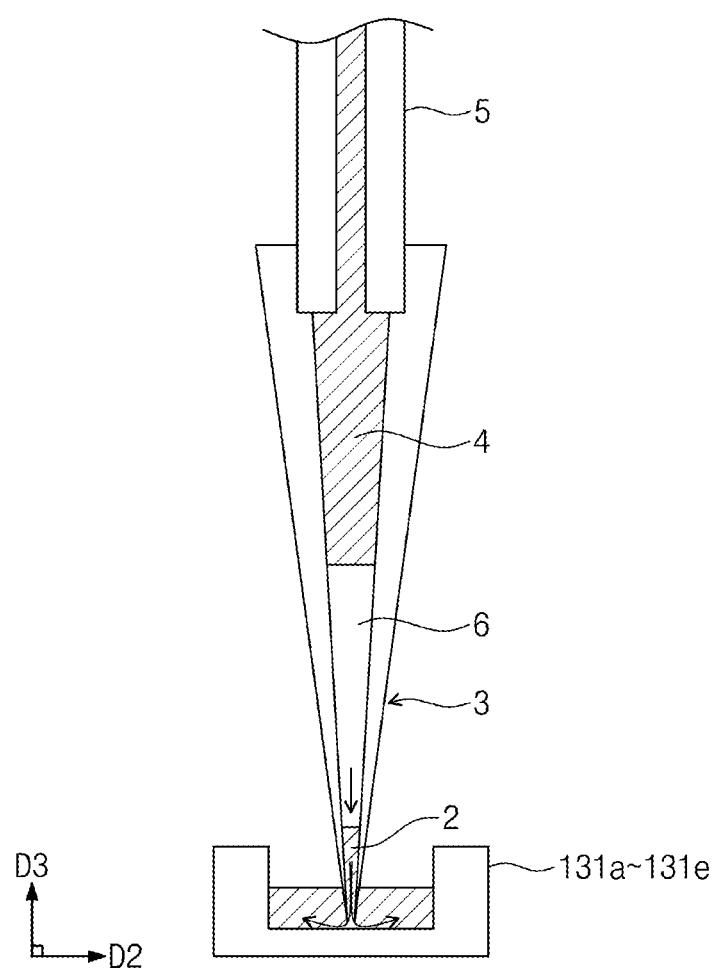

Referring to FIG. 7, the pipette 3 may be moved over the reaction wells 131a to 131e, etc. after passing through the process illustrated in FIGS. 2 and 3. The controller may adjust the pressure of the washing solution 4 by controlling the liquid pump. As the pressure of the washing liquid 4 changes, the washing solution 4 may move in a direction opposite to the third direction D3. As the lower level of the washing solution 4 descends, the gas 6 may be pushed down. As the gas 6 moves down, the reaction solution 2 may be pushed down. The reaction solution 2 may be discharged to the reaction wells 131a to 131e, etc. Various bio-reactions may be performed by the reaction solution 2 in the reaction wells 131a to 131e, etc.

Figure 8:
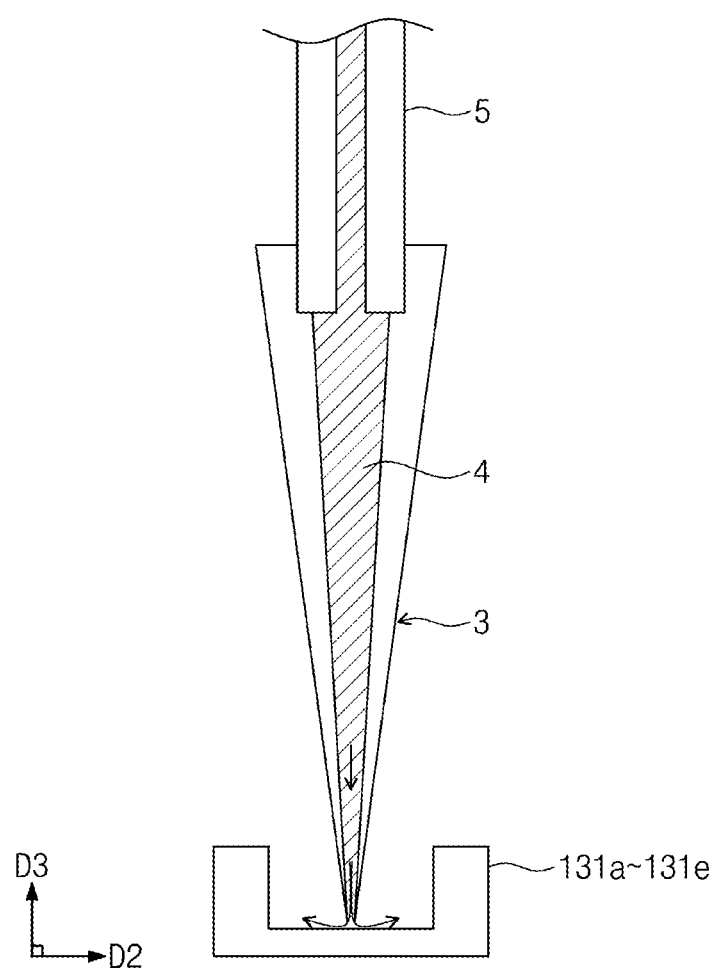

Referring to FIG. 8, when the reaction well, etc. need to be washed, the washing solution 4 existing in the internal space of the pipette 3 may be discharged to the outside. That is, as the controller controls the liquid pump, the pressure of the washing solution 4 may be adjusted. After the washing solution 4 pushes out all of the gas, the washing solution 4 itself may also be discharged to the outside of the pipette 3. The washing solution 4 may wash the reaction well, etc.

In the fluid control equipment for a bio-reaction according to the embodiments of the inventive concept, the pipette, which transports the reaction solution, is operated by the washing solution as the working fluid, so that the washing solution may be discharged while transporting the reaction solution with one pipette. An additional device may be unnecessary for the washing process required during a bio-reaction. In addition, a plurality of reactions may be performed simultaneously through a single pump by using a plurality of the microchannels and a plurality of the pipettes connected to the pressure equalization tank. Accordingly, the volume of the bio-reaction system may be reduced. Costs for the bio-reaction system may be reduced.

In the fluid control equipment for a bio-reaction according to the embodiments of the inventive concept, the washing solution and the reaction solution are separated from each other and not contacted by the gas, so that mixing of the washing solution and the reaction solution may be prevented. Therefore, the accuracy of a reaction may be improved.

Figure 9:
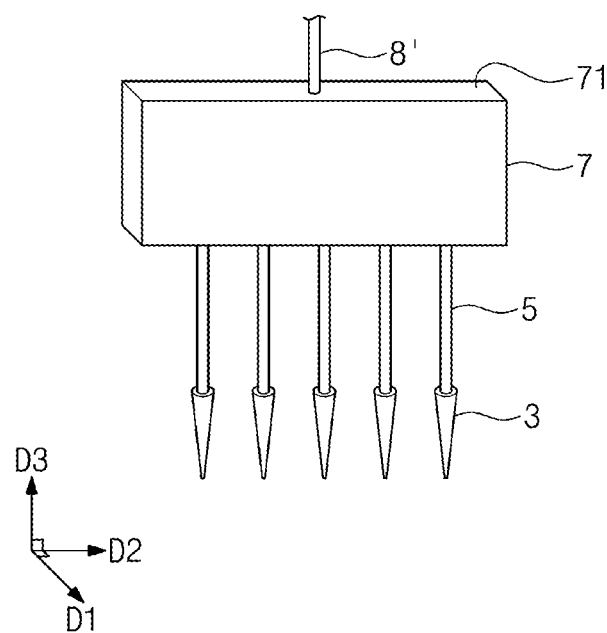
FIG. 9 is a perspective view illustrating a pressure equalization tank according to embodiments of the inventive concept.

FIG. 9 is a perspective view of the pressure equalization tank according to the embodiments of the inventive concept.

Hereinafter, descriptions of configurations substantially the same as or similar to those described with reference to FIGS. 1 to 8 may be omitted for the convenience.

Referring to FIG. 9, the injection tube 8' may be coupled to an upper surface 71 of the pressure equalization tank 7. The working fluid may be supplied from the liquid pump through the injection tube 8' coupled to the upper surface 71.

Figure 10:
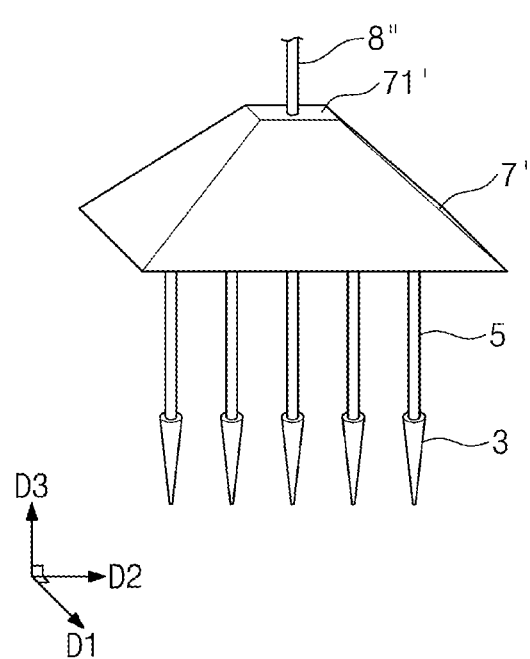
FIG. 10 is a perspective view illustrating a pressure equalization tank according to embodiments of the inventive concept.

FIG. 10 is a perspective view of the pressure equalization tank according to the embodiments of the inventive concept.

Hereinafter, descriptions of configurations substantially the same as or similar to those described with reference to FIGS. 1 to 8 may be omitted for the convenience.

Referring to FIG. 10, the pressure equalization tank 7' may be shaped such that the cross-sectional area thereof becomes smaller toward the third direction D3. An injection tube 8" may be coupled to the upper surface 71' of the pressure equalization tank 7'.

According to the inventive concept, fluid control equipment for bio-reaction may perform spray of a washing solution and transport of a reaction solution by using the same pipette.

According to the inventive concept, fluid control equipment for bio-reaction may reduce the volume thereof.

According to the inventive concept, fluid control equipment for bio-reaction may control a plurality of pipettes at the same flow rate.

According to the inventive concept, fluid control equipment for bio-reaction may obtain an accurate result even when a plurality of pipettes is used.

According to the inventive concept, fluid control equipment for bio-reaction may ensure convenience in performing a bio-reaction and may also improve reproducibility.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The effects of the inventive concept are not limited to the above-described effects and further effects, not described above, will be clearly understood to those skilled in the art from the following description.

What is claimed is:

1. Fluid control equipment for bio-reaction, comprising:
a plurality of microchannels extending from a pressure equalization tank;
a plurality of pipettes coupled to respective microchannels of the plurality of microchannels and configured to transport a reaction solution; and
a liquid pump configured to adjust the internal pressure of the plurality of pipettes,
wherein the pressure equalization tank equalizes pressure between the plurality of microchannels, and each of the plurality of microchannels has the same length.

2. The fluid control equipment of claim 1, wherein a working fluid positioned in the plurality of pipettes comprises a liquid.

3. The fluid control equipment of claim 2, wherein the working fluid in the plurality of pipettes comprises a washing solution.

4. The fluid control equipment of claim 1, wherein the pressure equalization tank is positioned between the liquid pump and the pipettes, and
wherein each of the plurality of pipettes is disposed in parallel to the pressure equalization tank.

5. The fluid control equipment of claim 4, wherein the plurality of pipettes and the plurality of microchannels are detachably coupled to each other, respectively.

6. The fluid control equipment of claim 1, further comprising a controller,
wherein the controller controls the liquid pump to adjust the pressure of a working fluid in the plurality of pipettes.

7. The fluid control equipment of claim 6, further comprising a movement device,
wherein the controller controls the movement device, and the movement device moves the position of the plurality of pipettes.

8. The fluid control equipment of claim 1, further comprising a storage tank,
wherein the storage tank is connected to the liquid pump and supplies a working fluid of the plurality of pipettes to the liquid pump.

9. A fluid control method for bio-reaction, comprising:
moving upwards a washing solution positioned in a pipette by operating a liquid pump;
moving upwards a gas positioned under the washing solution by moving the washing solution upwards;
absorbing a reaction solution from a reaction solution well into the pipette by moving the gas upwards;
moving the pipette to a reaction well;
discharging the reaction solution from the pipette to the reaction well by moving the gas downwards;
moving the pipette to the reaction solution well;
discharging the washing solution from the pipette to the reaction solution well by operating the liquid pump; and
washing the reaction solution well using the washing solution discharged from the pipette by operating the liquid pump.

* * * * *